Aug. 5, 1941.    B. S. WATLING    2,251,812
LAWN AND GARDEN SPRINKLER
Filed Feb. 5, 1940
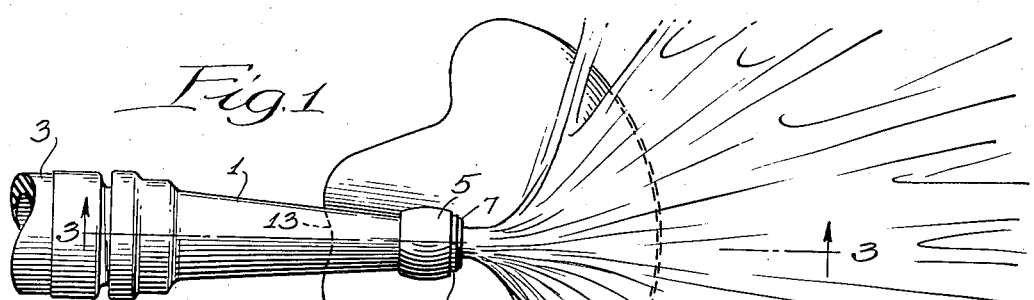
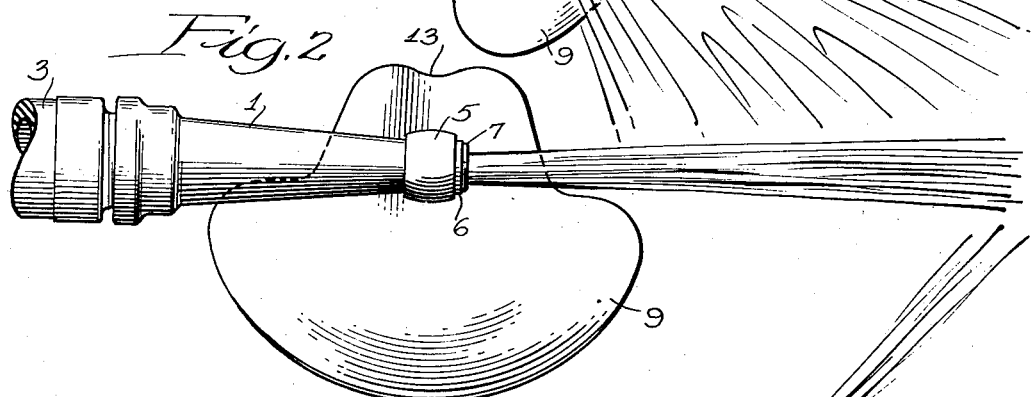
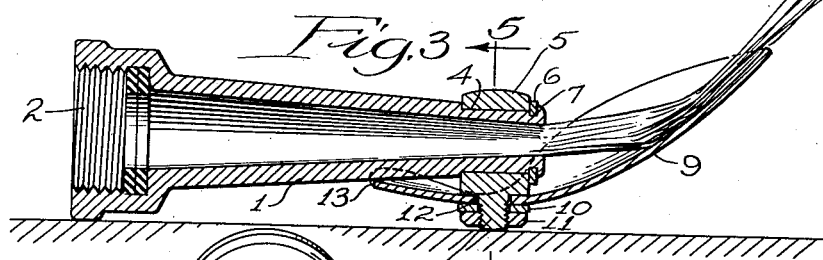
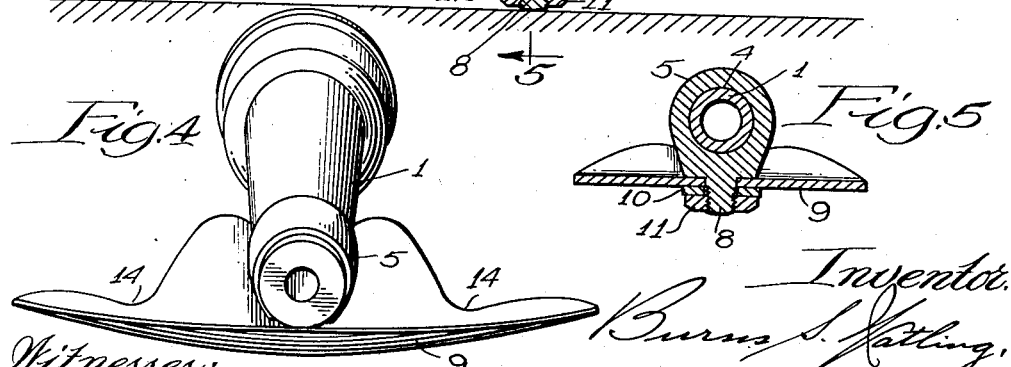
Inventor:
Burns S. Watling,
By Soans, Pond & Anderson,
Attorneys.

Patented Aug. 5, 1941

2,251,812

UNITED STATES PATENT OFFICE 2,251,812

LAWN AND GARDEN SPRINKLER

Burns S. Watling, Hinsdale, Ill.

Application February 5, 1940, Serial No. 317,289

2 Claims. (Cl. 299—129)

This invention relates to lawn and garden sprinklers.

Among the objects of this invention are, to provide an improved form of sprinkler for attachment to a lawn and garden hose, which will disperse the stream of water in a fine sheet-like and fan-shaped spray for effectively watering lawn and gardens; to provide a sprinkler which, by a simple adjustment of the deflector relatively to the nozzle will afford either a fine fan-like spray or a straight solid stream; and to provide such a sprinkler wherein the deflector may be readily turned about the axis of the nozzle so as to lie horizontally on the ground regardless of the angular position of the nozzle.

An illustrative embodiment of this invention is shown in the accompanying drawing, wherein:

Fig. 1 is a top plan view, showing the deflector in position to afford a fine fan-like spray.

Fig. 2 is a view similar to Fig. 1, but showing the deflector turned to an inoperative position, permitting a straight, relatively thick spray to issue from the nozzle.

Fig. 3 is a longitudinal section on the line 3—3 of Fig. 1.

Fig. 4 is a front perspective view showing the nozzle tipped downwardly and forwardly.

Fig. 5 is a sectional detail on the line 5—5 of Fig. 3.

In the form shown in the drawing, the improved sprinkler comprises a tapered nozzle 1 having its inlet end internally threaded as shown at 2 for attachment to the usual garden hose 3 and having its outlet end reduced to form an annular seat 4 for rotatably supporting a collar 5. The outlet end of the nozzle 1 is further reduced to form an annular seat for a washer 6 and the adjacent extremity of the nozzle is peened against the washer 6 as shown at 7 for securing the washer and collar against displacement.

Formed on the collar 5 is a radially disposed threaded stud 8 for pivotally supporting a deflector plate 9 which is secured against displacement by means of a lock washer 10 and nut 11 mounted on the stud 8.

The improved deflector 9 may be made of any suitable material but it is preferably formed of relatively thin sheet metal and is substantially fan-shaped. Formed in the plate 9 is an aperture 12 for receiving the pivot stud 8. As shown in Figures 3 and 4, the relatively wide fan-shaped sector of the deflector is bent to form a concave or dished inner surface for exposure to the stream of water for the purpose of dispersing the water into a fine sheet-like fan-shaped spray as shown in Figures 1 and 3.

On opposite sides of the pivot, the deflector plate is cut away as shown in Figures 1 and 2 so as to permit the deflector plate to be moved out of the path of the stream of water when a fine spray is not desired.

In order to prevent accidental displacement of the spray while the sprinkler is in use, it is desirable to provide means for locking the deflector plate in both of the positions shown in Figures 1 and 2. For this purpose, the reduced portion of the deflector plate is also slightly concaved and its rim is bent upwardly to frictionally engage the nozzle 1. Formed in the central portion of the rim of the reduced part of the deflector is a recess 13 for receiving the shank of the nozzle when the deflector plate occupies its operative position as shown in Figure 1. Formed in the rim of the deflector on opposite sides of the pivot are dips or notches 14, either one of which is adapted to form a seat for the shank of the nozzle when the deflector is moved to its inoperative position as shown in Figure 2.

In operation, when a fine and wide spray is desired, the deflector 9 is set in the position shown in Figures 1 and 3 in which position the shank of the nozzle frictionally engages the seat 13 in the rim of the plate. In this position the deflector extends upwardly at an angle to and across the longitudinal axis of the nozzle so that the stream of water impinges on the concave side of the deflector plate and is, by the latter, widened and thinned so that it issues from the deflector plate in the form of a fan-shaped spray.

If, on the other hand, it is desired to use the sprinkler for a straight relatively thick stream, the deflector plate is simply turned through a right angle to the position shown in Figure 2, in which position the deflector plate is without effect on the spray.

The collar 5 may have a tight bearing on the nozzle but it is preferably rotatable on the nozzle so that the deflector plate may be readily adjusted to correct working position about the axis of the nozzle without having to turn the latter and the hose on their axis to obtain the desired position of the deflector plate.

Although but one specific embodiment of this invention has been herein shown and described, it will be understood that details of the construction shown may be altered without departing from the spirit of the invention as defined by the following claims.

I claim:

1. A sprinkler for garden hose comprising a nozzle, and a substantially fan-shaped deflector plate pivotally mounted on said nozzle so as to be partially rotatable to move the broad portion thereof into and out of the path of the water issuing from said nozzle, said plate having an upwardly bent rear portion formed with a notch in its upper edge adapted to frictionally engage said nozzle for yieldingly securing said deflector plate in operative position.

2. A sprinkler for garden hose comprising a nozzle, a collar rotatably supported on said nozzle, and a deflector plate pivotally mounted on said collar on an axis substantially normal to the longitudinal axis of said nozzle, said deflector plate having a substantially fan-shaped segment movable into the path of the stream of water issuing from said nozzle for dispersing the water in a fine spray, and an upwardly bent rear portion formed with a central notch in its upper edge adapted to frictionally engage said nozzle for yieldingly securing said segment in operative position, and said deflector plate also having notches in the upper edges of its side portions adapted to seat said nozzle for yieldably securing said segment in inoperative position.

BURNS S. WATLING.